May 8, 1934.  J. F. WERDER  1,957,683

MECHANISM FOR SOLDERING METAL CONTAINERS

Filed March 9, 1931

INVENTOR
John F. Werder
BY Milburn and Milburn
ATTORNEYS

Patented May 8, 1934

1,957,683

UNITED STATES PATENT OFFICE 1,957,683

MECHANISM FOR SOLDERING METAL CONTAINERS

John F. Werder, Lakewood, Ohio, assignor of one-half to Edmund Rogers, South Euclid, Ohio Application March 9, 1931, Serial No. 521,232

6 Claims. (Cl. 113—68)

This invention relates to the art of metal containers and involves more especially an improved method and apparatus for soldering the joint or joints of the container.

The object of the present invention is to devise an automatic machine which is capable of performing the soldering operation for the joint or joints of the container with at least the same degree of efficiency as has been heretofore obtained by hand operation.

More specifically, the object consists in devising a means in an automatic machine structure for producing the necessary wiping action between the joint or joints of the container and the means corresponding to the soldering iron.

Another object consists in providing a means for permitting only a film of solder in proper condition to be supplied to the joint.

Other objects will appear from the following description and claims when considered together with the accompanying drawing.

Figure 1:
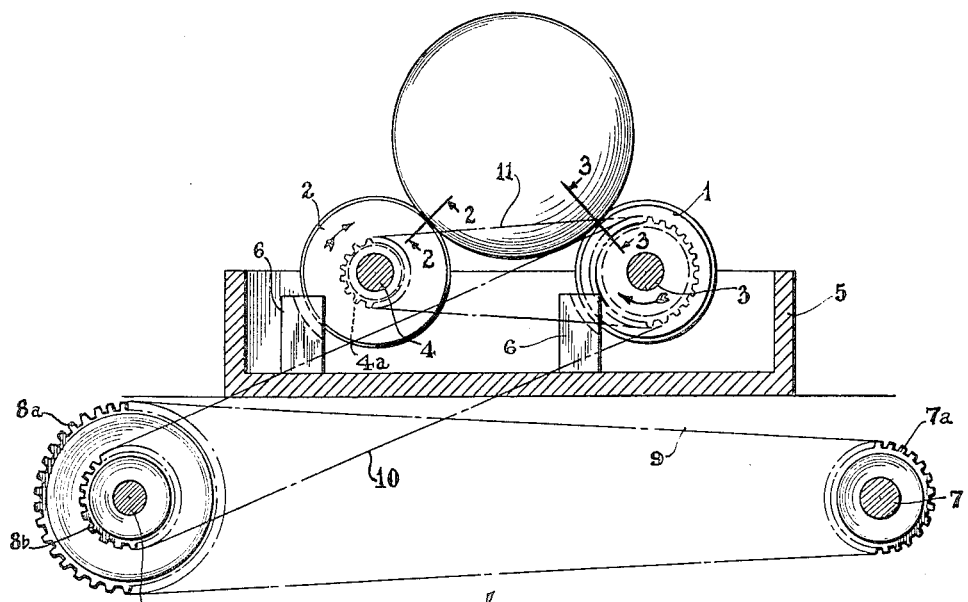
Figure 2:
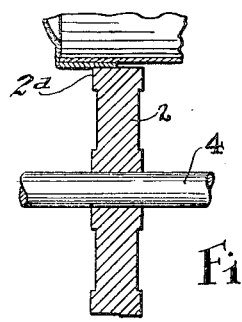
Figure 3:
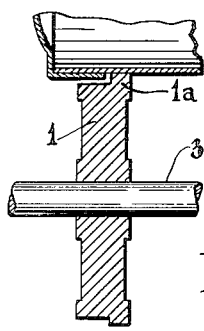
Figures 4, 5:
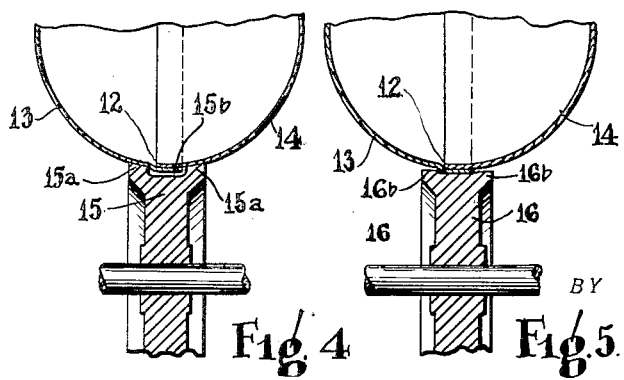

Fig. 1 is an end view partly in section illustrating the manner of applying a cylindrical container to the soldering rolls and means for operating the same; Figs. 2 and 3 illustrate the manner of engagement of the soldering rolls with the adjacent regions of the head joint of the container, and are taken on lines 2—2 and 3—3 of Fig. 1; and Figs. 4 and 5 are similar views illustrating the same invention applied to spherical containers.

It is to be understood that the present disclosure is merely for purposes of illustration and that there may be devised various modifications in this structure without departing from the spirit of the present invention as herein set forth and claimed.

Whereas, according to the old practice of soldering the joints of metal containers by hand, a soldering iron is drawn over the joint to be soldered, likewise in the present case there is performed a wiping action or engagement between the soldering rolls of the machine and the joint which is to be soldered. The present automatic machine structure is devised to perform substantially the same wiping engagement but at a higher rate of speed and with a more uniform degree of engagement and soldering throughout the entire area of the joint. Any suitable form of automatic mechanism may be employed for conveying the containers to and from the soldering rollers.

According to the present invention, the metal container to be soldered may be positioned either manually or automatically between the rollers for engagement of the head joints thereby. If so desired, both head joints of a cylindrical container may be soldered in the same manner at the same time, by like sets of rollers to engage both ends of the container, or the two head joints may be soldered successively by reversing the position of the container in the same set of rollers.

In the present case, there are provided the rollers 1 and 2 upon the shafts 3 and 4, these rollers being spaced at proper distance apart to receive a cylindrical metal container in the manner herein illustrated. The rollers 1 and 2 are arranged opposite each other at the end of the container and one of them is provided with a projecting annular portion 1ª for engaging one portion of the joint area, the roller 1 being free of engagement with the remaining portion thereof. The roller 2 is so formed that its engaging portion 2ª will have operative contact with the remaining portion of the joint area for the soldering operation. Thus, the combined action of the portions 1ª and 2ª will serve to produce the complete soldering operation of the entire joint area. The same thing is true at both ends of the container when the two end joints thereof are soldered simultaneously.

The rollers 1 and 2 are operated in the same direction, as indicated in Fig. 1, and are arranged so as to be automatically fed with a film of solder which is contained within the bath 5. As a means of preventing the undesirable oxidized top surface of the solder bath from being carried by the rollers to the surface of the joint which is to be soldered, I have provided the shoes 6 which have cut-out recesses, the bottoms of which are curved according to the curvature of the rollers. The curved surfaces of these shoes are spaced from the peripheries of the rollers 1 and 2 at proper distance to prevent such undesirable oxidized surface portion of the solder from being carried upwardly by the rollers but without interfering with the rotation of the same. Thus, there is insured the transfer of only a clear film of solder from the bath to the joint area. Any suitable means may be employed for applying the proper degree of heat to the rollers 1 and 2 for the soldering operation.

As a means of producing the necessary wiping action between the rollers and the joint area, I have devised the principle of operating the rollers 1 and 2 at different speeds and in the present illustration, they are rotated in the same direction. This manner of operation will cause the container to turn continuously about its own longitudinal axis as it rests upon the rollers 1 and 2, with the result that there is a uniform relative movement between the surface of the joint area and the surfaces of the rollers 1 and 2. Or, wiping action may be produced by operating the rollers in opposite directions and at different rates of speed. According to the present illustration, the rollers 1 and 2 are indicated as being of the same diameter and hence the operation of these rollers at different speeds will produce a corresponding difference in the surface or linear speed thereof. However, instead of operating rollers of the same diameter at different rates of speed, there may be employed a modified form of structure having rollers of different diameters operated at the same speed which would produce the same net result of different surface speeds of the rollers, and consequently, a rotation of the container about its longitudinal axis so as to effect an efficient wiping action between the joint area and the soldering rollers.

In the present illustration in which the rollers of the same diameter are operated at different speeds, and in the same direction, the operating mechanism therefor is shown to include a suitable combination of sprockets and chains of proper relative dimensions. In the present case, the shaft 7 which may be driven from any suitable source of power, drives the shaft 8 at a reduced rate of speed by means of the sprocket 7ª, sprocket chain 9, and sprocket 8ª. Then in turn the sprocket 8ᵇ upon the shaft 8 drives the shaft 3 at somewhat reduced speed by means of the sprocket chain 10 so as to obtain practical operating speed. The shaft 3 drives the shaft 4 by means of the sprocket 3ª, sprocket 4ª, and sprocket chain 11, these sprockets being of different diameters so that the two shafts 3 and 4 are operated at different speeds for the purpose above indicated. It is to be understood that the actual speed of the shaft 3 and the ratio of speeds between the shafts 3 and 4 may be varied according to circumstances.

The same invention as above set forth can be employed also for the soldering of the circumferential joint 12 of a two-part spherical metal container of which the halves are indicated partially in Figs. 4 and 5 by reference numerals 13 and 14. In this case, the container will be supported by the rollers 15 and 16 arranged in the same manner as in the other form of invention hereinbefore described, and the rollers may be operated in the same general manner and with the same variations or modifications as to direction and relative speed of rotation of the rollers. In the case of the spherical container, the roller 15 has the opposite marginal, circumferential flanges 15ª which are adapted to engage only the opposite side portions of the joint region while the middle part of the circumferential surface of the roller has a comparatively deep groove 15ᵇ which does not engage the main part of the joint. The roller 16 is provided with the comparatively shallow groove 16ª between the marginal flange portions 16ᵇ, so that only the main part of the joint is engaged by the roller 16. Thus, the rollers 15 and 16 supplement each other in their engagement of the entire joint region, in the same manner as hereinbefore explained, and the solder may also be supplied to the rollers 15 and 16 in the same manner as in the other form of device above described.

Thus, I have devised a convenient and efficient means of soldering the joint or joints of the metal container in a machine structure with the speed of production incident thereto and with increased uniformity of the soldering throughout the entire region of the said joints. Furthermore, the application of the solder to the joint region by means of the separate rollers which engage individual parts of such region, has been found to produce more satisfactory results than are possible with any other form of device known at the present time.

This is due to the fact that with the present invention, the engaging portions 1ª and 2ª of the rollers will each have effective contact with its corresponding part of the joint region, without any irregularities of the surface of the one part of the joint region interfering with the engagement of the other roller with its particular part of the joint region. That is, the individual portions 1ª and 2ª of the rollers will each be better enabled to contact the particular surface irregularities of the corresponding part of the joint region, with the result that the entire circumferential joint region will be thus properly heated and supplied with a film of solder, and the solder which is thus applied to the adjoining portions of the joint region will merge across the edge of the head flange and find its way into the intermediate joint space of the entire joint region. This same advantage is realized in both of the forms of container joints herein illustrated as well as in connection with any other form of joint to which the present invention might be applied.

The following claims are intended to comprehend any and all modified forms of which the present invention is capable.

What I claim is:

1. In a machine for soldering metal containers of the type having a circumferential joint, the combination of a pair of rotatable rollers for soldering the joint, said rollers being spaced and adapted to receive the container therebetween so that the joint of the container may engage the rollers, means for supplying solder to said rollers, and means for operating said rollers in the same direction and at different rates of surface speed from each other, whereby there is produced a wiping action between the rollers and the joint for effectively performing the soldering operation.

2. In a machine for soldering metal containers of the type having a circumferential joint, the combination of a pair of rotatable rollers for soldering the joint, said rollers being spaced and adapted to receive the container therebetween and to engage individual zones of the joint, means for supplying solder to said rollers, and means for operating said rollers in the same direction and at different rates of surface speed from each other, whereby there is produced a wiping action between the rollers and the joint for effectively performing the soldering operation throughout the entire head joint.

3. In a machine for soldering metal containers of the type having a circumferential joint, the combination of a pair of rotatable rollers for soldering the joint, said rollers being spaced and adapted to receive the container therebetween and each having a flange portion of proper location and depth to engage a definite part of the joint so that the combined action of the rollers will be effective upon the entire joint, means for supplying solder to said rollers, and means for operating said rollers in the same direction and at different rates of surface speed from each other, whereby there is produced a wiping action between the rollers and joint for effectively performing the soldering operation.

4. In a machine for soldering metal joints, the combination of a pair of rotatable rollers, said rollers being spaced and adapted to receive the joint therebetween so as to engage the rollers, means for supplying solder to said rollers, and means for operating the rollers in the same direction and at different rates of surface speed from each other, whereby there is produced a wiping action between the rollers and the joint for effectively performing the soldering operation.

5. In a machine for soldering metal containers of the type having a circumferential joint, the combination of a pair of rotatable rollers for soldering the joint, said rollers being spaced and adapted to receive the container therebetween and upon the upper sides thereof for soldering engagement of the joint thereby, means for supplying solder to the rollers, and means for operating said rollers in the same direction and at different rates of surface speed from each other, whereby the containers can be both applied to and removed from the rollers from a point above the same and there is produced a wiping action between the rollers and the joint for effectively performing the soldering operation.

6. In a machine for soldering metal containers of the type having a circumferential joint, the combination of a pair of rotatable rollers for soldering the joint, said rollers being spaced and adapted to receive the container therebetween and upon the upper sides thereof for soldering engagement of the joint thereby, means for supplying solder to the rollers, means for operating said rollers in the same direction and at different rates of surface speed from each other, whereby the containers can be both applied to and removed from the rollers from a point above the same and there is produced a wiping action between the rollers and the joint for effectively performing the soldering operation, and means located at the lower part of the rollers for preventing undesirable portions of the solder from being conveyed by the rollers to the point of use.

JOHN F. WERDER.